United States Patent
Nishio

(10) Patent No.: US 8,917,427 B2
(45) Date of Patent: Dec. 23, 2014

(54) RECEIVING APPARATUS, IMAGE-FORMING APPARATUS, RECEIVING METHOD AND RECORDING MEDIUM

(75) Inventor: Yukihito Nishio, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 481 days.

(21) Appl. No.: 13/093,969

(22) Filed: Apr. 26, 2011

(65) Prior Publication Data

US 2011/0261408 A1  Oct. 27, 2011

(30) Foreign Application Priority Data

Apr. 27, 2010  (JP) .................................. 2010-102425

(51) Int. Cl.
| | |
|---|---|
| H04N 1/36 | (2006.01) |
| H04B 1/00 | (2006.01) |
| H03D 3/24 | (2006.01) |
| H04N 1/00 | (2006.01) |

(52) U.S. Cl.
CPC .................................. *H04N 1/00222* (2013.01)
USPC ........................... 358/410; 375/147; 375/376

(58) Field of Classification Search
CPC .................................. H04B 1/707; G06F 3/12
USPC .................................. 375/376, 147; 358/1.15
See application file for complete search history.

(56) References Cited

U.S. PATENT DOCUMENTS

2007/0120989 A1* 5/2007 Minami et al. ................. 348/266
2009/0086875 A1* 4/2009 Shao et al. ..................... 375/376

FOREIGN PATENT DOCUMENTS

| JP | 2001-268355 A | 9/2001 |
| JP | 2002-094497 A | 3/2002 |
| JP | 2002-158839 A | 5/2002 |

\* cited by examiner

*Primary Examiner* — Douglas Tran
*Assistant Examiner* — Justin Katzwhite
(74) *Attorney, Agent, or Firm* — Edwards Wildman Palmer LLP; David G. Conlin; Stephen D. LeBarron

(57) ABSTRACT

When receiving data in a unit of frame, each frame including a plurality of bits, based on a spread clock signal, a receiving time per bit of receiving data is calculated based on a receiving rate, and the change cycle of the spread clock signal is adjusted according to the receiving time per bit.

6 Claims, 9 Drawing Sheets

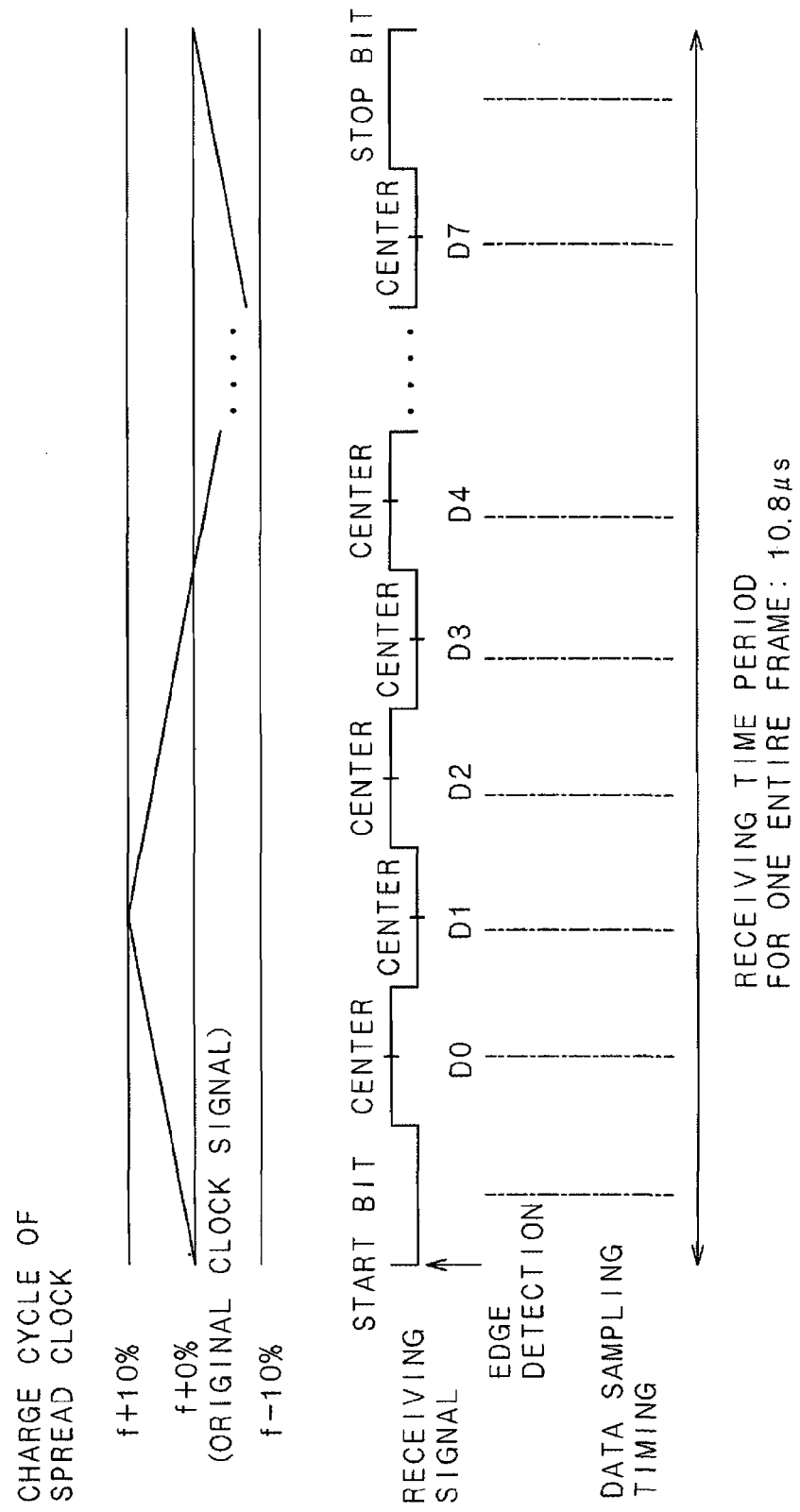

RECEIVING APPARATUS, IMAGE-FORMING APPARATUS, RECEIVING METHOD AND RECORDING MEDIUM

CROSS-REFERENCE TO RELATED APPLICATION

This non-provisional application claims priority under 35 U.S.C. §119(a) on Patent Application No. 2010-102425 filed in Japan on Apr. 27, 2010, the entire contents of which are hereby incorporated by reference.

BACKGROUND

1. Technical Field

The present invention relates to a receiving apparatus having a clock generating section for outputting a spread clock signal which is generated by cyclically increasing and decreasing the frequency of a clock signal, to an image-forming apparatus comprising the receiving apparatus, to receiving method and to recording medium.

2. Description of Related Art

Conventional circuits for preventing EMI (Electro Magnetic Interference) of electronic equipment use methods, such as a method of filtering harmonic components of a clock signal of the electronic equipment, a method of effectively securing a return ground (GND), and a method of scattering radiation energy by spreading the spectrum of a clock signal.

The above-mentioned method of scattering radiation energy by spreading the spectrum of a clock signal is implemented by changing the frequency of the clock signal with time. A known system for changing the frequency of the clock signal with time is an analog system using a PLL (Phase Locked Loop) or a digital system using a variable delay circuit (variable delay line).

Patent Document 1 (see Japanese Patent Application Laid-Open No. 2001-268355) discloses an image-reading apparatus which, when modulating a drive clock in photoelectric converting means and an analog process by a spread spectrum clock signal (hereinafter referred to as the spread clock signal), aligns the phases of modulation cycles of the spread spectrum clock signal in accordance with a main scanning line signal LSYNC to match the phases of modulation frequencies, thereby making cyclic noise in a main scanning line equal to that in the following main scanning lines and enabling removal of noise by the shading processing means in the later stage to meet EMI regulations.

SUMMARY

On the other hand, as a method of changing the frequency of a clock signal with time, both cyclically increasing and decreasing the frequency of the original clock signal is generally used. In such a case, however, using the spread clock signal for performing serial communication sometimes causes a problem of non-established communication.

The described above problem will be explained in detail below. For the sake of simplifying the explanation, the problem is explained by way of an example in which the receiver side performs start-stop synchronous communication with the sender side at a communication speed of 921.6 kBPS and receives a frame in which the start bit is 1 bit, data bits are 8 bits, and the stop bit is 1 bit.

In the start-stop synchronous type serial communication, when the receiver detects an edge of the start bit of data with level changing from High to Low sent from the sender, it starts receiving. At this time, the receiver synchronizes its own clock signals, and detects a signal (data bit) to be received (performs data sampling) according to the clock signal. Thereafter, when the receiver receives a high-level stop bit, it completes the receiving of one frame.

FIG. 1 is an explanatory view explaining the conventional relationship between signal receiving and data sampling on the receiver side. As described above, since the communication speed is 921.6 kBPS, the receiving (transmission) time per bit is 1.09 μs, and the receiving time taken for one entire frame is 10.8 μs. After detecting the edge of the start bit, the receiver estimates the center of each bit and determines the timing of data sampling, based on its own clock signal. For example, when spectrum spreading is not performed on the original clock signal, the frequencies of the clock signals are the same on the receiver side and the sender side, and, as illustrated in FIG. 1, the receiver starts data sampling 0.54 μs after detecting the edge of the start bit, and performs data sampling every 1.09 μs.

On the other hand, when the receiver side performs spectrum spreading on the original clock signal for preventing EMI, a spread clock signal is generated by cyclically increasing (by, for example, +n %) and decreasing (by, for example, −n %) the frequency of the original clock signal, and signal reception (data sampling) is performed by using the spread clock signal.

If one increase (or decrease) of the frequency and the following one decrease (or increase) are defined as one change cycle of the spread clock signal, "a frequency increase range" where the frequency is higher than the original frequency and "a frequency decrease range" where the frequency is lower than the original frequency are present in one change cycle. On the other hand, the average frequency in one change cycle is equal to the frequency of the original clock signal because the increase of the frequency and the decrease of the frequency are cancelled out. The following will explain an exemplary case where the frequency of the original clock signal is 3.68 MHz and the frequency increases and decreases by 10% on the receiver side, that is, a case where the above-mentioned n is 10, or the so-called spread rate is 10%.

FIG. 2 is a graph showing the increase/decrease of the frequency and one change cycle of a conventional spread clock signal. The horizontal axis represents time, and the vertical axis represents the frequency. In the example shown in FIG. 2, the change cycle is 128 clk, or, in other words, the change cycle is 34.7 μs (or 28.75 kHz).

After the frequency of the spread clock signal gradually increases up to 10%, the spread clock signal gradually returns to the original frequency. This period is the frequency increase range. Then, after the frequency of the spread clock signal gradually decreases down to −10%, the spread clock signal returns to the original frequency again. This period is the frequency decrease range. In the frequency increase range, data sampling is performed at earlier time than the original frequency, while in the frequency decrease range, data sampling is performed at delayed time than the original frequency.

FIG. 3 is an exemplary view illustrating exemplarily the relationship between the change cycle of a spread clock signal and a frame to be received in one case where establishment of communication fails. FIG. 4 is an explanatory view explaining a mismatch in data sampling when a conventional spread clock signal is used. In the illustrated example, the receiving time taken for one frame (10 bits) is shorter than ½ of the change cycle of the spread clock signal, and receiving is completed within the frequency increase range. In other words, data sampling is performed on the frame by using the spread clock signal with an increased frequency. Thus, data sampling is performed earlier compared to the case where the original clock is used. This accumulates with time, and the accumulation is increased towards the later part of receiving of the signal (frame), namely, towards the stop bit.

For example, when the receiver side performs data sampling by using the original clock signal, it performs data sampling of the stop bit 10.35 μs (0.54+1.09×9) after the detection of the edge of the start bit.

On the other hand, in the example shown in FIG. 3, the frame is symmetrical about a point on the time axis where the frequency of the spread clock signal is maximum, and the receiving (transmission) time per frame is 10.8 μs as described above, and therefore the average frequency of the spread clock signal in receiving the frame is +6.89%. Hence, 9.636885 μs {(0.54+1.09×9)×(1−0.0689)} after the detection of the edge of the start bit, the receiver side performs data sampling of the stop bit. In other words, when performing data sampling of the stop bit, there is a difference of 0.713115 μs (10.35−9.636885) between data sampling using the original clock signal and data sampling using the spread clock signal, and the receiver side performs data sampling of the stop bit earlier by this amount of time.

Thus, when the spread clock signal is used, data sampling is performed 0.713115 μs earlier than data sampling using the original clock signal. This is longer than the time from the center of one bit to the edge (0.54 μs). Therefore, the receiver performs data sampling of data bit (D7) at the timing of data sampling the stop bit, and fails to establish communication with the sender.

The failure of establishing communication occurs not only in the case where receiving is completed within the "frequency increase range" of the spread clock signal as described in the above example, but also in the case where receiving is completed within the "frequency decrease range" for the same reason. However, the image-reading apparatus of Patent Document 1 is not capable of solving such a problem.

The present invention has been made with the aim of solving the above problem, and it is an object of the present invention to provide a receiving apparatus and an image-forming apparatus which, when receiving data including a plurality of bits based on a spread clock signal, is capable of adjusting the change cycle of the spread clock signal according to the receiving time per bit, and thereby capable of preventing a failure in establishing communication when receiving data using the spread clock signal, and certainly obtaining EMI reducing effects.

The receiving apparatus according to the present invention is a receiving apparatus for receiving data, based on a spread clock signal whose frequency cyclically increases and decreases, comprising: a receiving section for receiving data including a plurality of bits, based on the spread clock signal; and a cycle-adjusting section for adjusting a change cycle of the frequency of the spread clock signal according to a receiving time per bit.

In this invention, the cycle-adjusting section adjusts the change cycle of the spread clock signal according to the receiving time per bit, and the receiving section receives data, based on the adjusted spread clock signal.

The receiving apparatus according to the present invention is a receiving apparatus according to claim 1, further comprising a calculating section for calculating, based on a receiving rate, a receiving time per bit of receiving data, wherein the cycle-adjusting section adjusts, based on the receiving time calculated by the calculating section, the change cycle of the spread clock signal so that the change cycle is 1/N (N: a natural number) of the receiving time per bit.

In this invention, the calculating section calculates, based on the receiving rate, a receiving time per bit of receiving data, and the cycle-adjusting section adjusts, based on the receiving time calculated by the calculating section, the change cycle of the spread clock signal so that the change cycle of the spread clock signal is 1/N of the receiving time per bit.

The receiving apparatus according to the present invention is a receiving apparatus according to claim 1, further comprising a calculating section for calculating, based on a receiving rate, a receiving time per bit of receiving data, wherein the receiving section receives data in a unit of frame, each frame including M (M: a natural number) bits, and the cycle-adjusting section adjusts, based on the receiving time calculated by the calculating section, the change cycle of the spread clock signal so that the change cycle is M times the receiving time per bit.

In this invention, the calculating section calculates, based on the receiving rate, a receiving time per bit of receiving data, and the cycle-adjusting section adjusts, based on the receiving time calculated by the calculating section, the change cycle of the spread clock signal so that the change cycle of the spread clock signal is M times the receiving time per bit.

A receiving apparatus according to the present invention is a receiving apparatus according to claim 1, wherein the cycle-adjusting section adjusts the change cycle of the frequency of the spread clock signal by using a phase synchronization circuit.

An image-forming apparatus according to the present invention is An image-forming apparatus comprising: a receiving apparatus as set forth in claim 1; and an image-forming section for forming an image on a sheet of a recording medium, based on receiving data from the receiving apparatus.

In this invention, data is received based on the spread clock signal whose change cycle is adjusted by the cycle-adjusting section of the receiving apparatus, and an image is formed on a sheet of a recording medium based on the data.

A receiving method according to the present invention is a receiving method for receiving data by a receiving apparatus comprising a receiving section for receiving data including a plurality of bits, based on a spread clock signal whose frequency cyclically increases and decreases, the method comprising the steps of: adjusting a change cycle of the frequency of the spread clock signal according to a receiving time per bit; and the receiving section receiving data, based on the spread clock signal whose frequency change cycle was adjusted.

A recording medium according to the present invention is a recording medium storing a computer-readable computer program for causing a computer, which constitutes a receiving apparatus comprising a receiving section for receiving data including a plurality of bits based on a spread clock signal whose frequency cyclically increases and decreases, to receive data, said computer program comprising the steps of: causing the computer to adjust a change cycle of the frequency of the spread clock signal according to a receiving time per bit; and causing the computer to instruct the receiving section to receive data, based on the spread clock signal whose frequency change cycle was adjusted.

This invention prevents a failure in establishing communication which might occurs when receiving data by using a spread clock signal as a measure to prevent EMI, and certainly obtains EMI reducing effects.

The above and further objects and features will more fully be apparent from the following detailed description with accompanying drawings.

BRIEF DESCRIPTION OF THE SEVERAL VIEWS OF THE DRAWINGS

FIG. 9 is a graph showing the relationship between the change cycle of a spread clock signal and a frame when the change cycle of the spread clock signal is M times the receiving time per bit.

DETAILED DESCRIPTION

Figure 1:
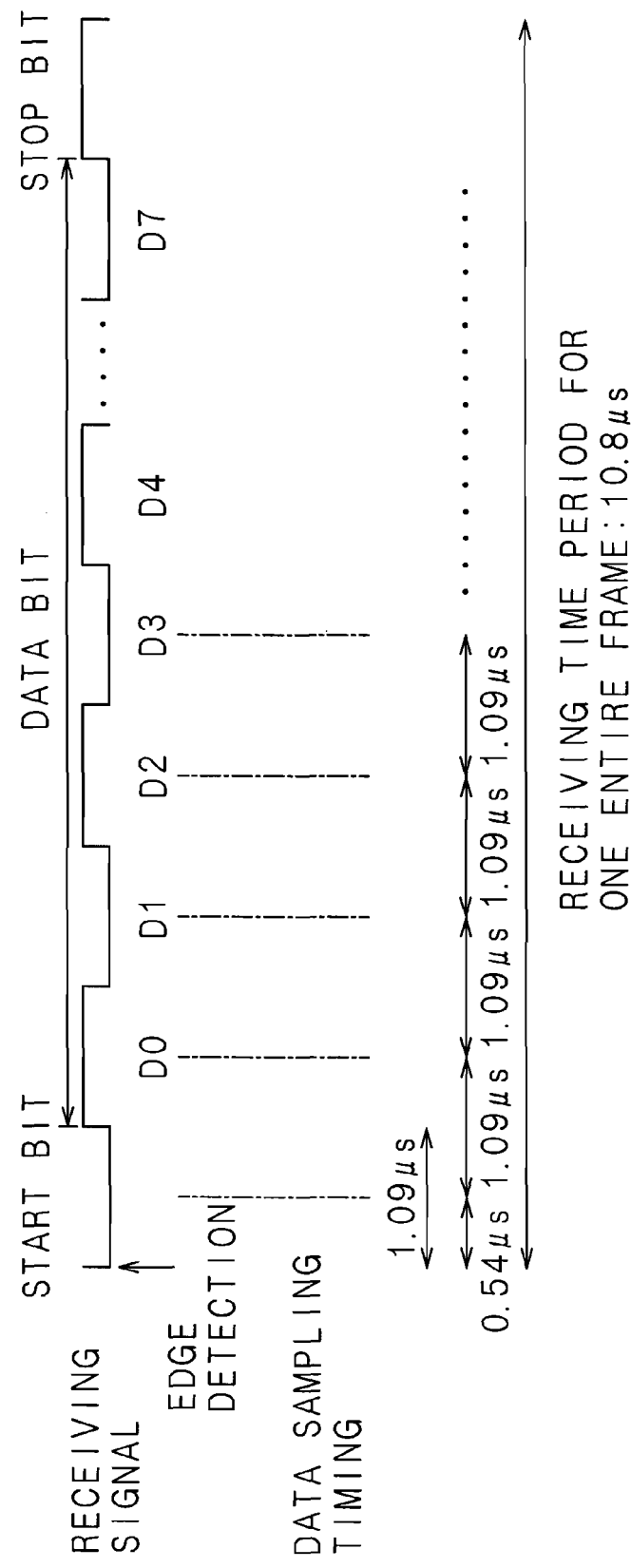
FIG. 1 is an explanatory view explaining the conventional relationship between signal receiving and data sampling on the receiver side.

Referring to the drawings, the following will explain the present invention in detail by way of an example in which a receiving apparatus and an image-forming apparatus according to an embodiment of the invention is applied to a multi-function printer.

Embodiment 1

Figure 5:
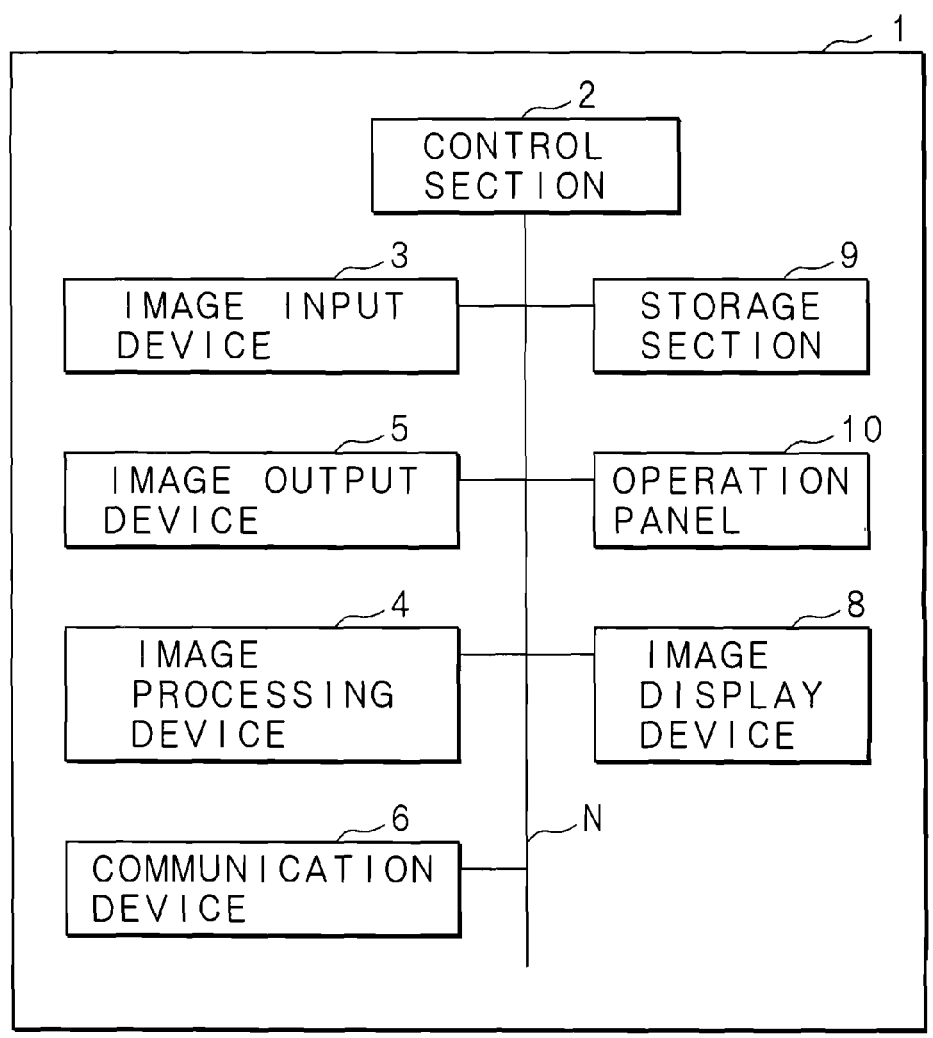
FIG. 5 is a functional block diagram for explaining the essential configuration of a multi-function printer according to Embodiment 1 of the present invention.

FIG. 5 is a functional block diagram for explaining the essential configuration of a multi-function printer according to Embodiment 1 of the Present Invention.

The multi-function printer 1 of Embodiment 1 of the present invention comprises: an image input device 3; an image output device 5; an image processing device 4; a communication device 6; an image display device 8; a storage section 9 (storage means); and an operation panel 10. These hardware devices are connected to a control section 2 by a bus N.

The image input device 3 comprises: a light source for irradiating light on a document to be read; and an image sensor such as a CCD (Charge Coupled Device), and optically reads an image on the document. In the image input device 3, a reflected light image from the document set on a given read place is focused onto the image sensor, and RGB (R: Red, G: Green, B: Blue) analog data are outputted.

The image output device 5 prints an image based on image data outputted from the image-processing device 4 on a recording medium, such as recording paper and an OHP film. The image output device 5 comprises: a photosensitive drum; a charger for charging the photosensitive drum to a given electric potential; a laser writing device for generating an electrostatic latent image on the photosensitive drum by emitting laser light according to image data received from an external device; a developing device for supplying toner to the electrostatic latent image formed on the photosensitive drum surface to visualize the image; and a transfer device for transferring the toner image formed on the photosensitive drum surface to the recording medium, and, for example, forms the image on the recording medium by an electro-photographic method.

The communication device 6 includes a network card, a modem etc. for receiving and obtaining document data from an external device, and, for example, sends image data after being processed by the image-processing device 4 to an external device.

The storage section 9 is a non-volatile semiconductor memory such as a hard disk, for example, and stores image data of a document obtained through the image input device 3, or document data received through the communication device 6.

The operation panel 10 includes: function buttons for switching functions, such as "Fax", "Copy", "Print", and "Mail", of the digital multi-function printer 1; ten-key; the Enter key for entering a received instruction; and the "Output" or "Copy" key for forming an image of a document read by the image input device 3 on a sheet of a recording medium.

The image display apparatus 8 is composed of a liquid crystal display, for example, to display information which is reported to the user, such as the status of the multi-function printer 1, the status of a job process, an image of a document read by the image input device 3, and the confirmation of the contents of operation of the operation device 10.

The image-processing device 4, for example, generates digital image data on the basis of analog data inputted from the image input device 3, or retrieves image data stored in the storage section 9, performs processing according to the type of each image, and then generates output image data (for the formation of an image). The output image data generated by the image-processing device 4 is outputted to the image output device 5, or the communication device 6.

The control section 2 comprises a CPU, a ROM, and a RAM (not shown). The ROM stores various kinds of control programs, and data in advance. The RAM is capable of storing data temporarily and allows the data to be read regardless of the order and place in which they are stored. For example, the RAM stores a program read from the ROM, various kinds of data generated by the execution of the programs, and various kinds of data received from external devices.

The multi-function printer 1 of Embodiment 1 of the present invention is configured to be capable of performing communication by using a spread clock signal generated by spreading the spectrum of a clock signal as a measure to prevent EMI during internal communication or external communication. The spread clock signal is obtained by increasing and decreasing the frequency of a clock signal and repeating a change cycle composed of one increase (or decrease) in the frequency of the clock signal and the following one decrease (or increase) to spread the spectrum so that the frequency of the clock signal has a given width. The detailed explanation is omitted here as it is given in the above (see the explanation of FIG. 2).

Figure 6:
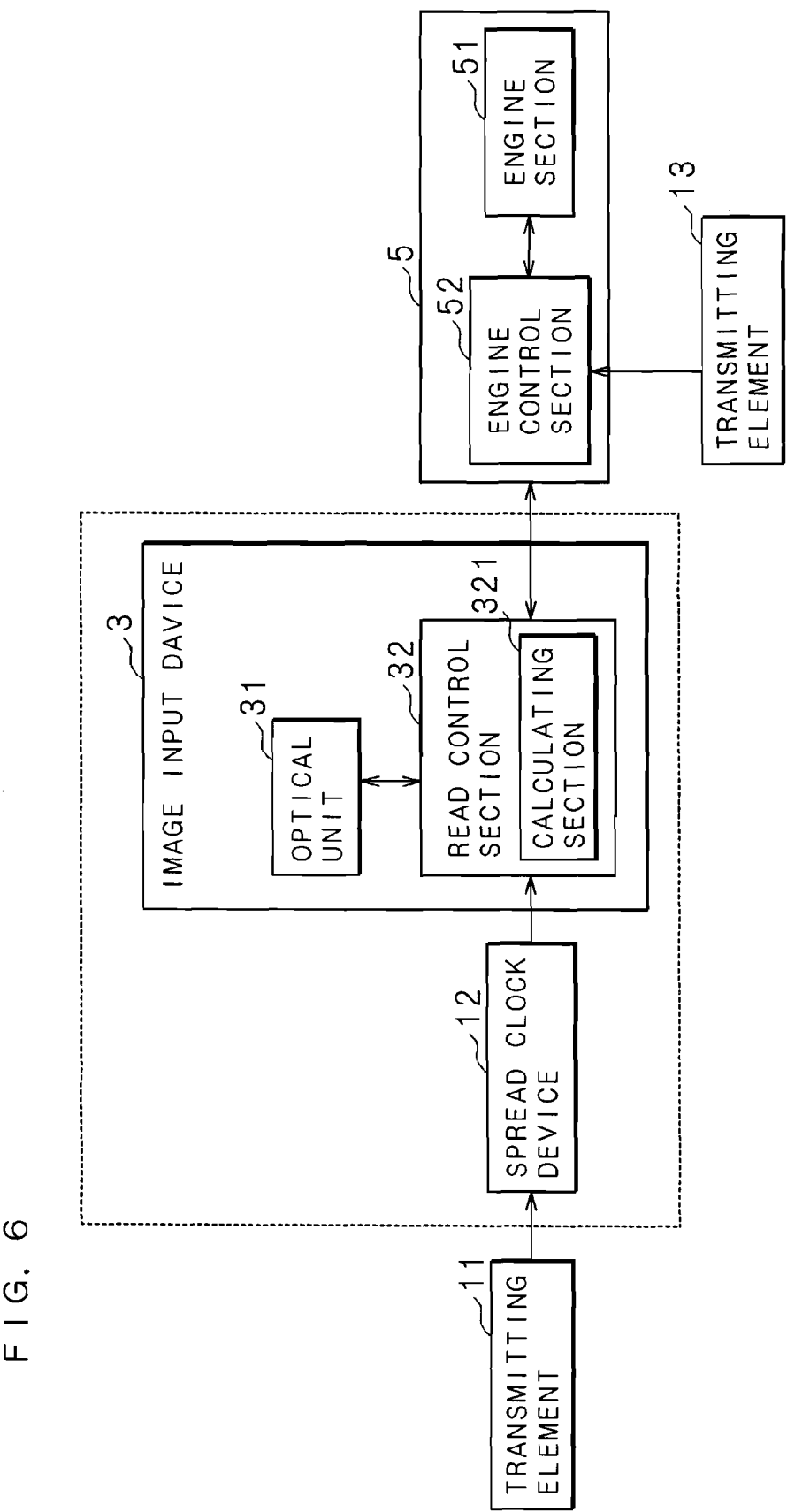
FIG. 6 is a functional block diagram for explaining one example of communication using a spread clock signal in Embodiment 1 of the present invention.

The following will explain communication using the spread clock signal in the multi-function printer 1 of Embodiment 1 of the present invention. FIG. 6 is a functional block diagram for explaining one example of communication using a spread clock signal in Embodiment 1 of the present invention. For the sake of simplifying the explanation, a case is explained by way of an example in which the communication speed between the image input device 3 and the image output device 5 is preset, the communication is start-stop synchronous communication performed at the communication speed, and data sent frame by frame from the image output device 5 is received by using the spread clock signal in the image input device 3.

The image output device 5 comprises: an engine section 51 for printing an image based on image data on a recording paper; and an engine control section 52 for controlling the engine section 51. With the use of a clock signal from a transmitting element 13 for outputting the clock signal, the engine control section 52 sends data to a read control section 32, for example.

The image input device 3 comprises an optical unit 31, and the read control section 32 (receiving section) for controlling the reading of an image by the optical unit 31 through a control ASIC (not shown). The read control section 32 receives data sent from the engine control section 52. A clock-spreading device 12 (frequency adjusting section) spreads the spectrum of a clock signal outputted from a transmitting element 11 for outputting a clock signal for use in receiving data by the read control section 32, and outputs the resulting spread clock. In Embodiment 1, the transmitting element 11 and the transmitting element 13 output clock signals of the same frequency.

The optical unit 31 comprises a mirror, a lens, and a CCD, and is configured to convert light, which is emitted from three light sources for emitting light of R (red), G (green) and B (blue) wavelengths representing three primary colors of light and is reflected from a document, into an electric signal.

Further, the read control section 32 comprises a calculating section 321. The calculating section 321 calculates a receiving time per bit of receiving data. In other words, since a communication speed is preset between the read control section 32 and the engine control section 52, the calculating section 321 calculates, based on the communication speed, the receiving time per bit.

The image input device 3 and the clock-spreading device 12 constitute a receiving apparatus (indicated with the dotted line in FIG. 6) according to Embodiment 1 of the present invention. When receiving data frame by frame sent from the engine control section 52 of the image output device 5, the read control section 32 of the image input device 3 detects an edge of the start bit and receives the data in synchronization with a spread clock signal from the clock-spreading device 12.

Figure 7:
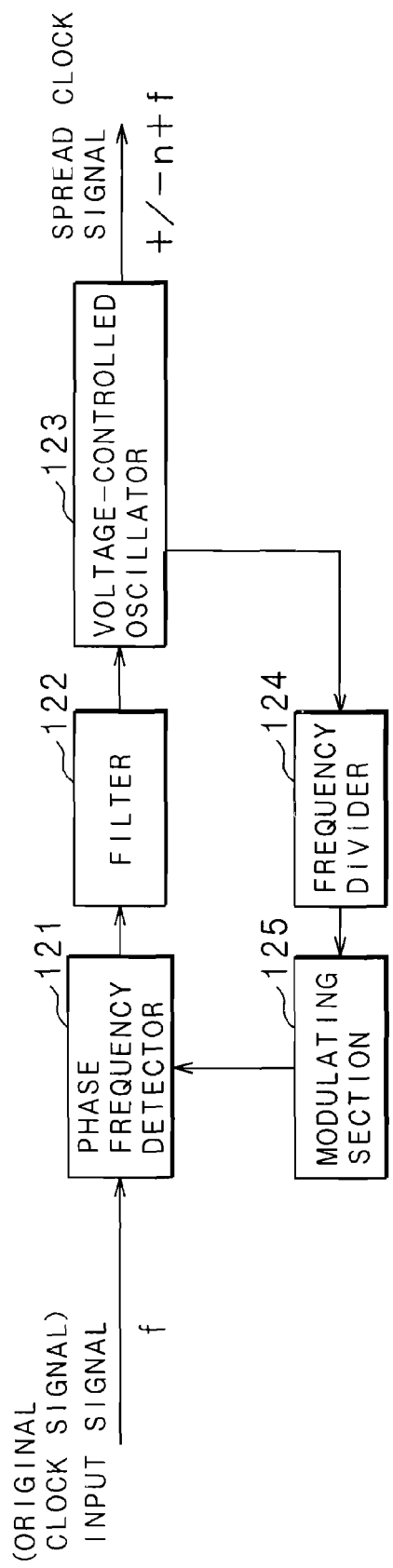
FIG. 7 is a block diagram illustrating the essential configuration of a clock-spreading device in the multi-function printer of Embodiment 1 of the present invention.

FIG. 7 is a block diagram illustrating the essential configuration of the clock-spreading device 12 in the multi-function printer 1 of Embodiment 1 of the present invention.

The clock-spreading device 12 uses a PLL circuit known in the art. The clock-spreading device 12 comprises: a phase frequency detector 121; a filter 122; a voltage-controlled oscillator 123; a frequency divider 124; and a modulating section 125, and adjusts the change cycle of a spread clock signal that will be outputted, according to the receiving time per bit of receiving data.

The phase frequency detector 121 compares the phase difference between an input signal (a clock signal from the transmitting element 11) and a signal fed back through the frequency divider 124, converts the phase difference between the two input signals into a voltage, and outputs the voltage. For example, if the fed-back signal delays compared to the input signal, a positive pulse with width according to the phase difference is outputted, whereas if the fed-back signal advances compared to the input signal, a negative pulse is outputted.

The filter 122 is, for example, a low-pass filter, and sends a signal from the phase frequency detector 121 as a control signal to the voltage-controlled oscillator 123.

The voltage-controlled oscillator 123 has a circuit capable of controlling the output frequency by the input voltage, and changes the frequency of an output signal according to the signal from the filter 122.

The frequency divider 124 is placed between the voltage-controlled oscillator 123 and the phase frequency detector 121, and feedbacks the output signal from the voltage-controlled oscillator 123 to the phase frequency detector 121. More specifically, the frequency divider 124 divides the frequency of the input signal from the voltage-controlled oscillator 123 by an integer and outputs the resulting signal.

The modulating section 125 is provided on the output side of the frequency divider 124 to adjust the frequency of the output signal from the frequency divider 124.

For instance, when the modulating section 125 decreases the frequency by a given value against the signal from the frequency divider 124, the phase frequency detector 121 obtains a comparison result indicating that the fed-back signal delays compared to the input signal, and therefore a positive pulse with width according to the phase difference is outputted. In the voltage-controlled oscillator 123, the frequency of the signal to be outputted according to the pulse is changed, and consequently a clock signal with a higher frequency (spread clock signal) compared to the input signal is outputted. By repeating such a loop, the output frequency of the spread clock signal in every loop becomes higher.

On the other hand, when the modulating section 125 increases the frequency only by a given value against the signal from the frequency divider 124, the phase frequency detector 121 obtains a comparison result indicating that the fed-back signal advances compared to the input signal, and consequently a clock signal with a lower frequency (spread clock signal) compared to the input signal is outputted.

Figure 2:
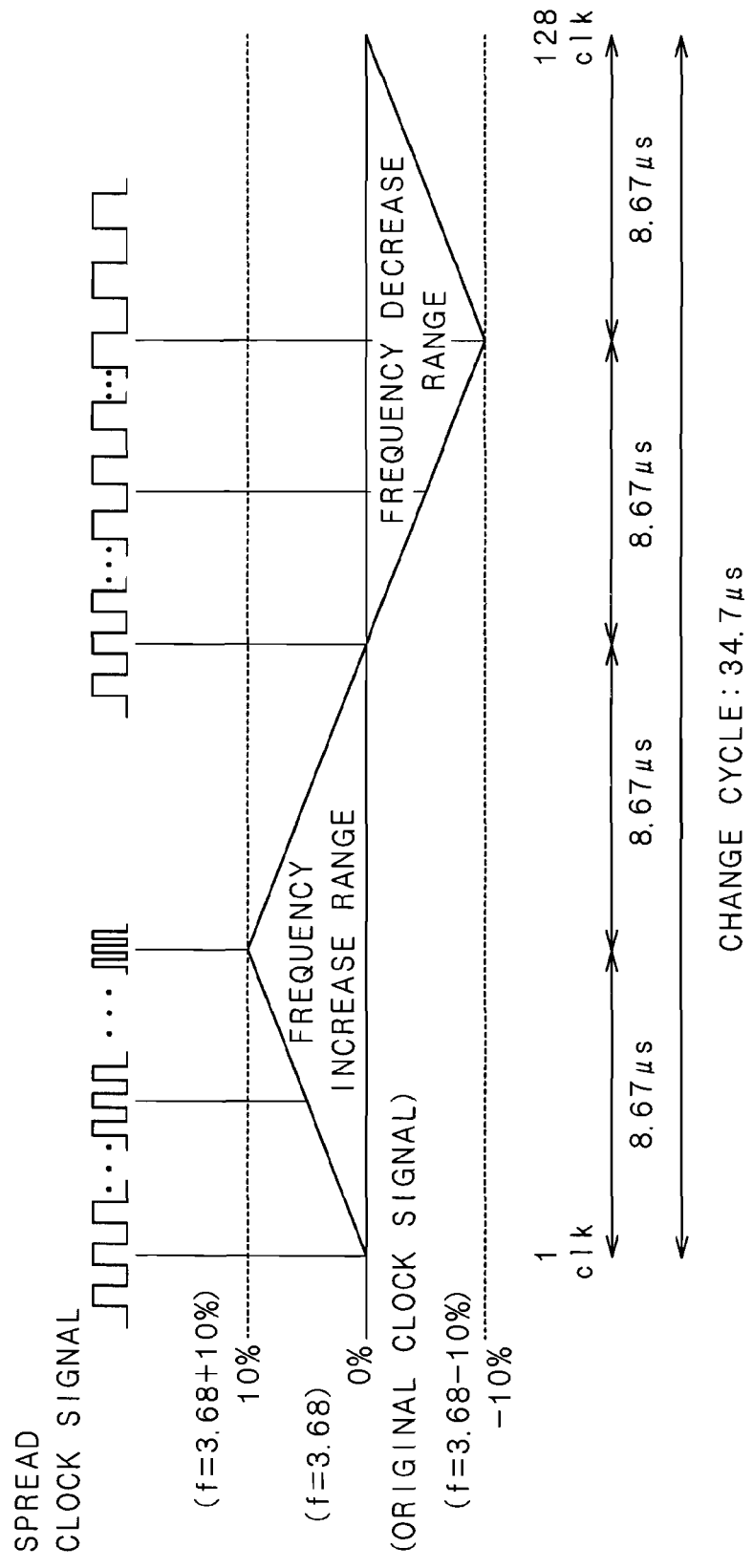
FIG. 2 is a graph showing the increase/decrease of the frequency and one change cycle of a conventional spread clock signal.
Figure 3:
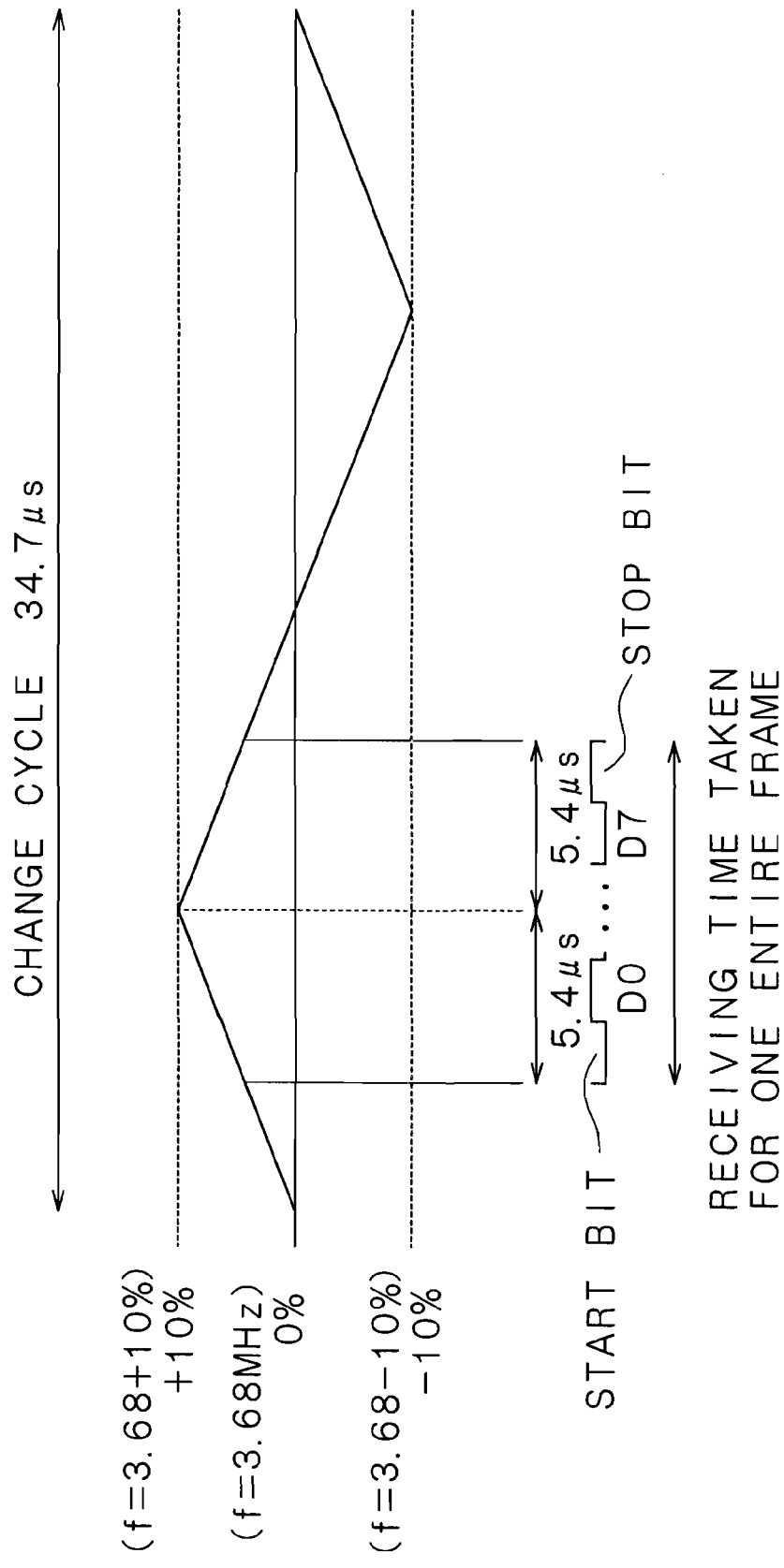
FIG. 3 is an exemplary view illustrating exemplarily the relationship between the change cycle of a spread clock signal and a frame to be received in one conventional case where establishment of communication fails.

When the modulating section 125 cyclically performs the above-described operations, the clock signal from the transmitting element 11 (hereinafter referred to as the original clock signal) is outputted as a spread clock signal whose frequency changes cyclically as illustrated in FIG. 2.

The modulating section 125 obtains a receiving time per bit of receiving data from the read control section 32, adjusts, based on the receiving time, the frequency of the signal outputted from the frequency divider 124, and modulates the change cycle of the spread clock signal to be outputted from the voltage controlled oscillator 123 so that it is 1/N (N: a natural number) of the receiving time per bit.

In other words, the modulating section 125 adjusts, based on the receiving time, the frequency of the signal outputted from the frequency divider 124, and outputs the signal whose frequency was adjusted (hereinafter referred to as the frequency-adjusted signal) to the phase frequency detector 121. The phase frequency detector 121 compares the frequency-adjusted signal and the original clock signal, converts the phase difference representing the comparison result into a voltage, and outputs the voltage. The voltage-controlled oscillator 123 changes the frequency of the signal to be outputted according to the voltage, and therefore the change cycle of the spread clock signal to be outputted is 1/N of the receiving time per bit.

Figure 8:
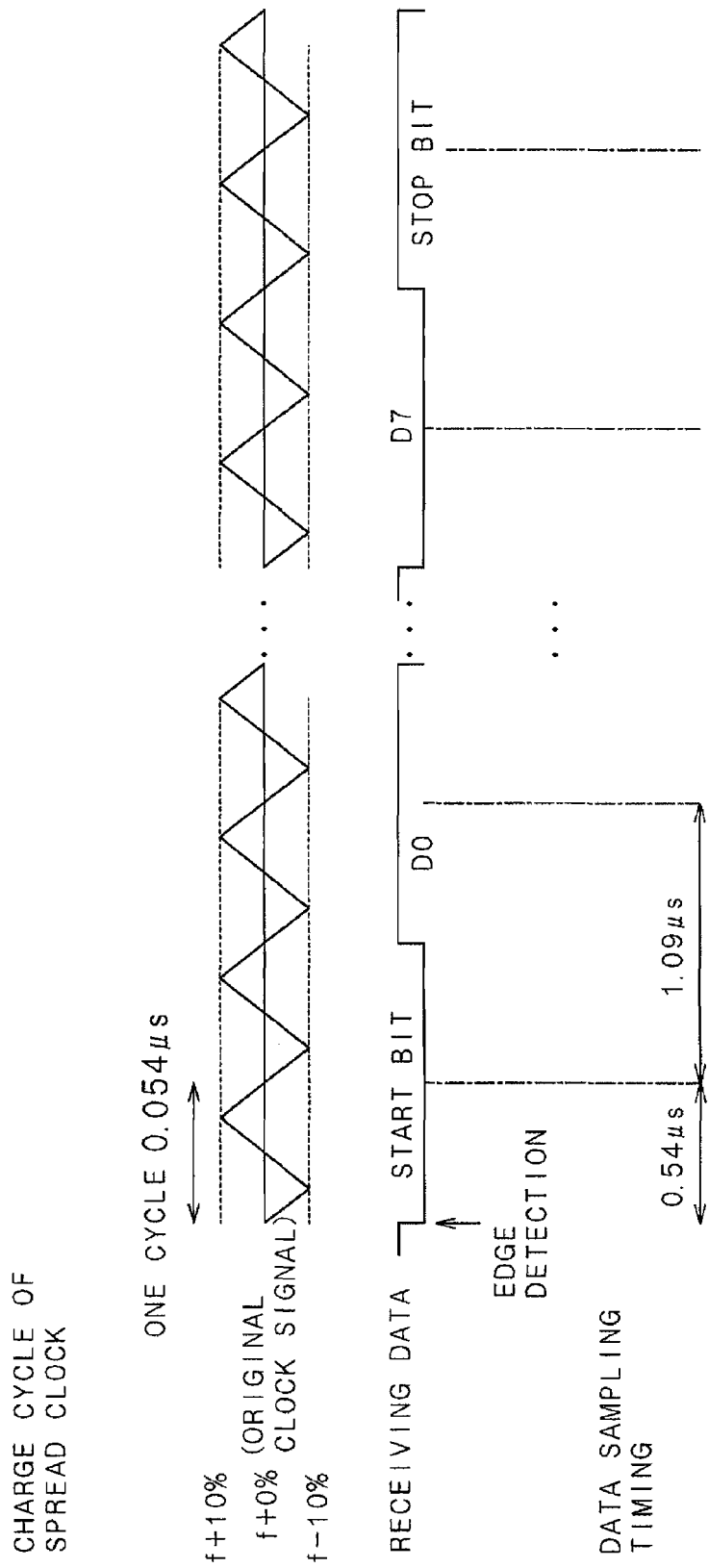
FIG. 8 is a graph showing the relationship between the change cycle of a spread clock signal and a frame when the change cycle of the spread clock signal is 1/N of the receiving time per bit.

FIG. 8 is a graph showing the relationship between the change cycle of a spread clock signal and a frame when the change cycle of the spread clock signal is 1/N of the receiving time per bit. In the example shown in FIG. 8, the N is 2. In other words, the change cycle repeats twice within the receiving time taken for one bit. Further, the frequency of the spread clock signal increases up to +10% based on the original clock signal in the frequency increase range, while the frequency decreases down to −10% based on the original clock signal in the frequency decrease range.

In this case, the change cycle of the spread clock is uniform in the receiving time taken for one bit. In other words, since the frequency increase range where the frequency increases compared to the original clock signal and the frequency decrease range where the frequency decreases compared to the original clock signal pass within the receiving time taken for one bit, the accumulated increase of the frequency in the frequency increase range and the accumulated decrease of the frequency in the frequency decrease range are cancelled out, and therefore there is no mismatch in the timing of data sampling of each bit.

Figure 4:
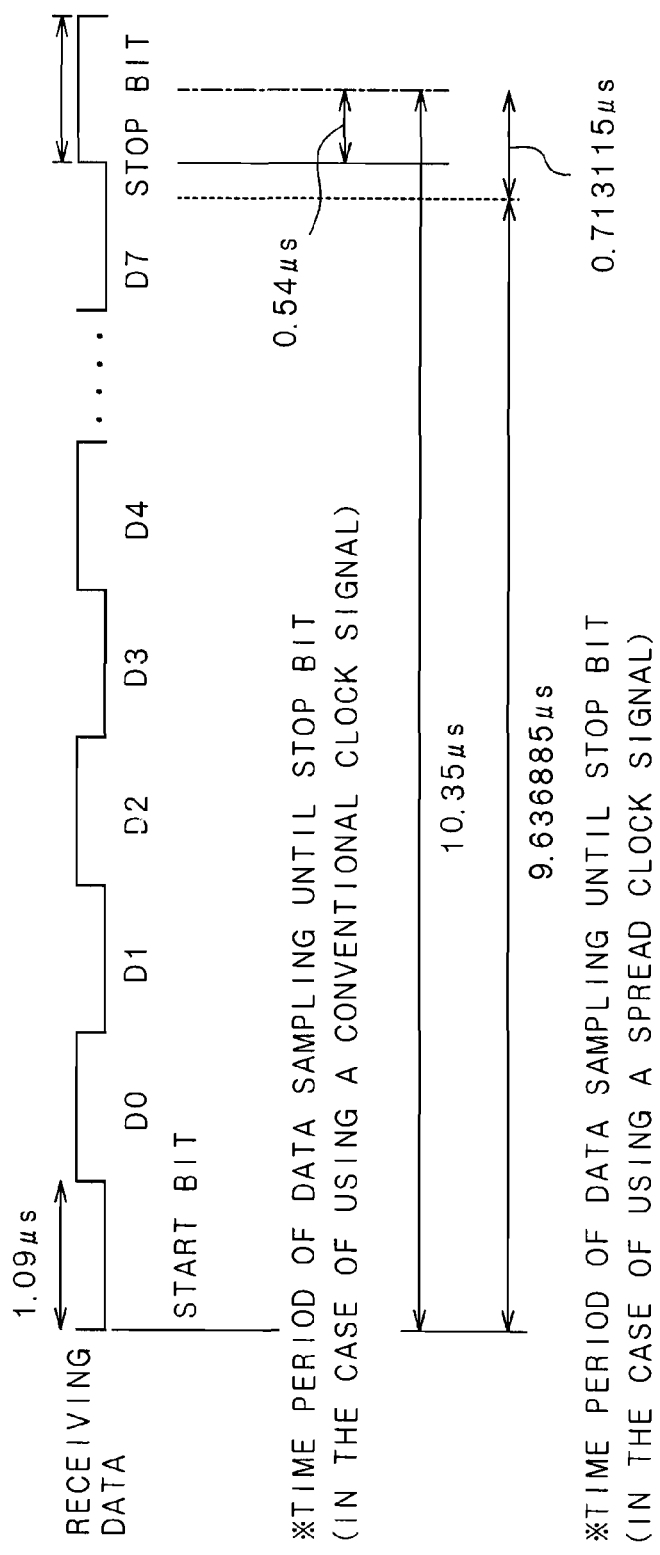
FIG. 4 is an explanatory view explaining a mismatch in data sampling when a conventional spread clock signal is used.

In other words, as explained with reference of FIG. 4 that, for example, when receiving is completed in the frequency increase range of the spread clock signal, or the frequency decrease range, a mismatch occurs in the timing of data sampling due to the accumulated increase of the frequency, or the accumulated decrease of the frequency, and the mismatch increases toward the stop bit and a so-called communication establishment failure problem occurs because data sampling of the stop bit is infeasible. However, the present invention is capable of preventing such a communication establishment failure problem.

The above explanation explains the present invention by way of an example in which the N is 2, but the present invention is not limited to this condition. When the N is a natural number, since the accumulated increase of the frequency in the frequency increase range and the accumulated decrease of the frequency in the frequency decrease range are cancelled out as described above, it is possible to prevent a communication establishment failure problem when performing start-stop synchronous communication by using the spread clock signal.

Embodiment 2

A multi-function printer 1 according to Embodiment 2 of the present invention has substantially the same configuration as that of the multi-function printer 1 of Embodiment 1, but this invention is different in the function of the modulating section 125 of the clock-spreading device 12. For the sake of simplifying the explanation, like Embodiment 1, Embodiment 2 is explained by way of an example in which start-stop synchronous communication is performed between the image input device 3 and the image output device 5, and the image input device 3 receives data sent frame by frame from the image output device 5 by using a spread clock signal. Note that the frame has M bits.

When receiving data sent frame by frame from the engine control section 52 of the image output device 5, the read control section 32 of the image input device 3 detects an edge of the start bit, and receives the data in synchronization with a spread clock signal from the clock-spreading device 12.

In the multi-function printer 1 of Embodiment 2 of the present invention, the modulating section 125 of the clock spreading device 12 obtains a receiving time per bit of receiving data from the read control section 32, adjusts the frequency of an output signal from the frequency divider 124 based on the receiving time, and modulates the change cycle of a spread clock signal to be outputted from the voltage controlled oscillator 123 so that it is M (M: a natural number) times the receiving time per bit.

In short, the modulating section 125 adjusts the frequency of the output signal from the frequency divider 124 based on the receiving time, and outputs the signal whose frequency was adjusted (hereinafter referred to as the frequency-adjusted signal) to the phase frequency detector 121. The phase frequency detector 121 compares the frequency-adjusted signal and the original clock signal, converts the phase difference representing the comparison result into a voltage, and outputs the voltage. The voltage-controlled oscillator 123 changes the frequency of the output signal according to the voltage, and therefore the change cycle of the spread clock signal to be outputted is M times the receiving time per bit. In other words, the change cycle of the spread clock signal is equal to the receiving time taken for the entire frame.

FIG. 9 is a graph showing the relationship between the change cycle of a spread clock signal and a frame when the change cycle of the spread clock signal is M times the receiving time per bit. In the example shown in FIG. 9, the M is 10. In short, the change cycle of the spread clock signal is equal to the receiving time taken for the entire frame (10 bits). Further, the frequency of the spread clock signal increases up to +10% based on the original clock signal in the frequency increase range, while the frequency decreases down to −10% based on the original clock signal in the frequency decrease range.

In this case, the receiving time taken for the entire frame matches the change cycle of the spread clock. In other words, since the frequency increase range and the frequency decrease range pass within the receiving time taken for the entire frame, the accumulated increase of the frequency in the frequency increase range and the accumulated decrease of the frequency in the frequency decrease range are cancelled out, and therefore there is no mismatch in the timing of data sampling of the stop bit. Thus, the above-mentioned communication establishment failure problem due to infeasibility of data sampling of the stop bit is prevented in the multi-function printer 1 of Embodiment 2 of the present invention.

Note that, when performing data sampling of each bit, since the data sampling timing is within a general tolerance range (15% to 20% before and after the center of a bit in the time axis direction), communication troubles do not occur.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A receiving apparatus for receiving data, based on a spread clock signal whose frequency cyclically increases and decreases, comprising:
   a receiving section for receiving data including a plurality of bits, based on the spread clock signal;
   a cycle-adjusting section for adjusting a change cycle of the frequency of the spread clock signal according to a receiving time per bit; and
   a calculating section for calculating, based on a receiving rate, a receiving time per bit of receiving data,
   wherein the cycle-adjusting section adjusts, based on the receiving time calculated by the calculating section, the change cycle of the frequency of the spread clock signal by using a phase synchronization circuit.

2. The receiving apparatus according to claim 1, wherein the change cycle is 1/N (N: a natural number) of the receiving time per bit.

3. The receiving apparatus according to claim 1, wherein the receiving section receives data in a unit of frame, each frame including M (M: a natural number) bits, and the change cycle is M times the receiving time per bit.

4. An image-forming apparatus comprising:
a receiving apparatus as set forth in claim 1; and
an image-forming section for forming an image on a sheet of a recording medium, based on receiving data from the receiving apparatus.

5. A receiving method for receiving data by a receiving apparatus comprising a receiving section for receiving data including a plurality of bits, based on a spread clock signal whose frequency cyclically increases and decreases, the method comprising the steps of:
adjusting a change cycle of the frequency of the spread clock signal according to a receiving time per bit;
the receiving section receiving data, based on the spread clock signal whose frequency change cycle was adjusted; and
calculating, by a calculation section, based on a receiving rate, a receiving time per bit of receiving data,
wherein adjusting includes adjusting, based on the receiving time calculated by the calculating section, the change cycle of the frequency of the spread clock signal by using a phase synchronization circuit.

6. A non-transitory recording medium storing a computer-readable computer program for causing a computer, which constitutes a receiving apparatus comprising a receiving section for receiving data including a plurality of bits based on a spread clock signal whose frequency cyclically increases and decreases, to receive data, said computer program comprising the steps of;
causing the computer to adjust a change cycle of the frequency of the spread clock signal according to a receiving time per bit;
causing the computer to instruct the receiving section to receive data, based on the spread clock signal whose frequency change cycle was adjusted; and
causing the computer to instruct a calculating section to calculate, based on a receiving rate, a receiving time per bit of receiving data,
wherein the computer program causes to computer to adjust, based on the receiving time calculated by the calculating section, the change cycle of the frequency of the spread clock signal by using a phase synchronization circuit.

* * * * *